United States Patent [19]

Linde

[11] Patent Number: 4,659,553
[45] Date of Patent: Apr. 21, 1987

[54] PROCESS FOR REMOVAL OF UNDESIRABLE GASEOUS COMPONENTS FROM HOT FLUE GASES

[75] Inventor: Gerhard Linde, Grunwald, Fed. Rep. of Germany

[73] Assignee: Linde Aktiengesellschaft, Wiesbaden, Fed. Rep. of Germany

[21] Appl. No.: 685,082

[22] Filed: Dec. 21, 1984

Related U.S. Application Data

[63] Continuation of Ser. No. 539,943, Oct. 7, 1983, abandoned.

[30] Foreign Application Priority Data

Oct. 8, 1982 [DE] Fed. Rep. of Germany ....... 3237387

[51] Int. Cl.$^4$ .................. C01B 17/00; B01D 19/00; B01D 39/00; B01D 57/00
[52] U.S. Cl. ......................................... 423/243; 55/73
[58] Field of Search ............... 423/242 R, 242 A, 243; 55/73

[56] References Cited

U.S. PATENT DOCUMENTS 2,139,375 12/1938 Millar et al. ................ 423/243
2,676,872  4/1954 Viard ........................ 423/243
3,503,186  3/1970 Ward, III .
3,533,732 10/1970 Moore et al. .
3,681,015  8/1972 Gelbein et al. ............... 423/243
3,966,825  6/1976 Bratzler ..................... 423/243
4,113,849  9/1978 Atwood .

OTHER PUBLICATIONS

L. F. Albright et al., Chemical Engineering Progress Symposium Series 44, vol. 59, 66 (1963).

Primary Examiner—Gregory A. Heller
Attorney, Agent, or Firm—Millen & White

[57] ABSTRACT

The invention refers to a process for the removal of undesirable gaseous components from hot flue gases incurred in the combustion of carbonaceous fuels. The flue gas is passed through regenerators for cooling and preliminary cleaning, and subsequently is scrubbed with a physically active solvent for $SO_2$ absorption. After absorbing $SO_2$, the solvent is subjected to regeneration and returned to the scrubbing process. For purposes of energy savings, it is suggested to heat exchange the hot flue gas in the regenerators with atmospheric air to cool it to temperatures between 0° and 60° C., and to scrub at this temperature with a solvent consisting predominantly of tetraethyleneglycol dimethylether. The process of the invention permits utilization of the exhaust heat of the flue gas to be purified.

21 Claims, 1 Drawing Figure

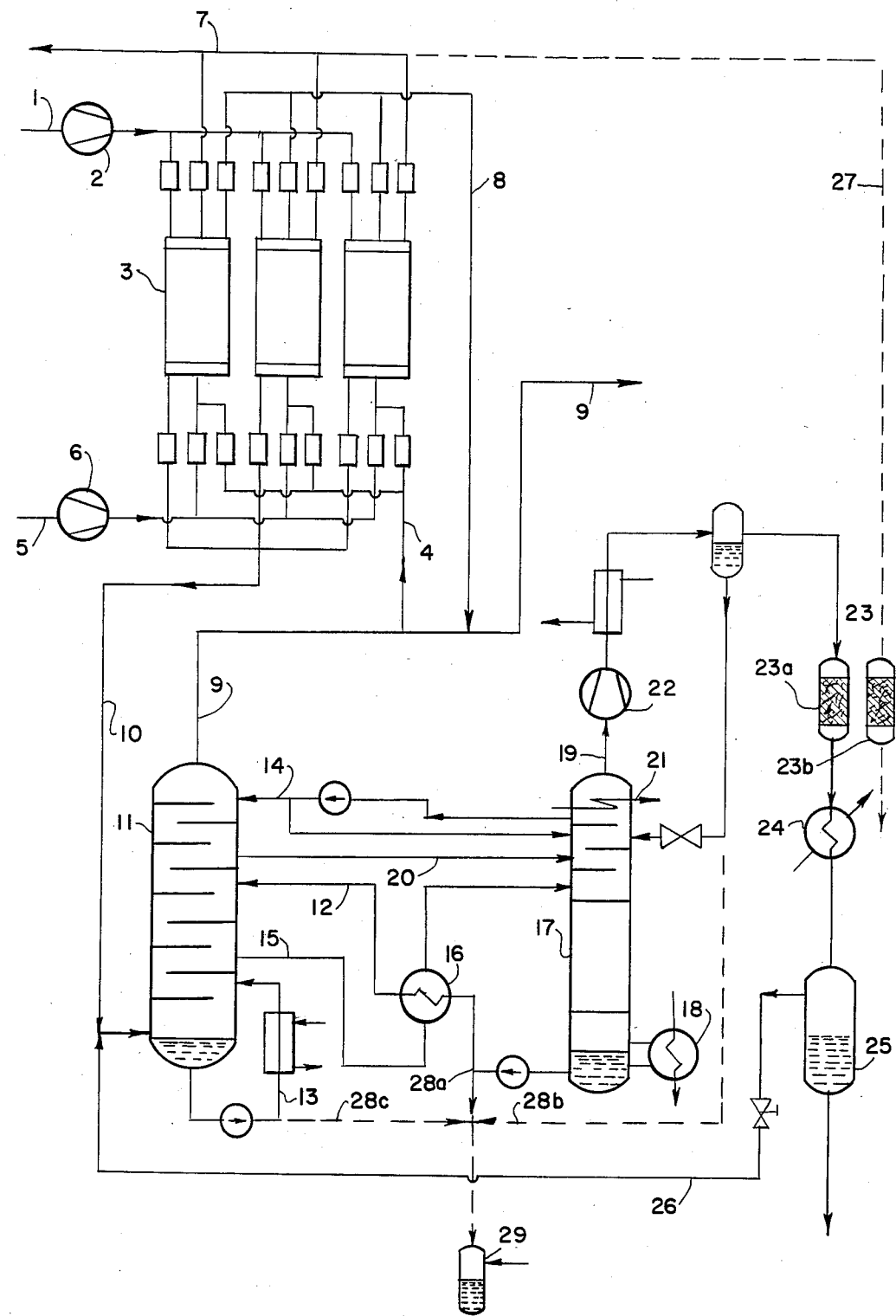

PROCESS FOR REMOVAL OF UNDESIRABLE GASEOUS COMPONENTS FROM HOT FLUE GASES

This application is a continuation of application ser. No. 539,943, filed Oct. 7, 1983, now abandoned.

The invention relates to a process for removal of undesirable gaseous components from hot flue gases, produced in the combustion of carbonaceous fuels, in which the flue gas is passed through regenerators for cooling and preliminary cleaning, and for the purpose of $SO_2$ absorption is subsequently passed to a scrubbing process with a physically active solvent. After $SO_2$ absorption, the solvent is subjected to regeneration and returned to the scrubbing cycle.

The problem of removal of undesirable gaseous components from combustion gases has to be addressed to an ever increasing degree. Sulfur-containing components, in particular, which are produced in the combustion of fossil fuels a e.g., in plants using coal or oil heat, are considered harmful to the environment and must be removed from the combustion gases before they are released into the atmosphere in the form of exhaust gases.

Many known processes for removing sulfur dioxide components treated such gases chemically, i.e. by scrubbing with absorption agents containing alkali or alkaline earth compounds. Ordinarily, the following were used for such purposes: alkaline earth oxides or alkaline earth carbonates, alkali carbonates or alkali bicarbonates, alkali sulfites or sodium hydrogen sulfites, or thiosulfates. The resultant reaction products were the corresponding sulfur-containing salts, i.e. sulfite, hydrogen sulfite and sulfates. Such scrubbing processes with chemical agents were mostly carried out at very high temperatures which were often the same or only slightly below the temperatures at which the combustion gases were produced. Apparatuses for such scrubbing processes, therefore, were subject to continuous high thermal stress and accordingly had to be made of suitable heat-resistant materials. Moreover, the exhaust gases to be finally vented frequently still contained water vapor and were released into the atmosphere at relatively high temperatures, even though part of their thermal energy was initially withdrawn for the purpose of generating steam or for preheating the combustion air.

German OS No. 28 48 721 suggests the removal of such gaseous components by scrubbing with a physically active agent, particularly, dimethyl formamide. This would impart the actually known desirable effects of a low temperature scrub with a physically active scrubbing agent combined with the favorable effects of utilizing the high temperature energy contained in the hot exhaust gases to compensate for losses in cold incurred in low temperature scrubbing. The drawback of this process is that it must be performed at temperatures of approximately $-40°$ C. due to the relatively high vapor pressure of the scrubbing agent at ambient temperature. A cooling of flue gases to such a low temperature requires a relatively large expenditure of energy and equipment.

It is the objective of the present invention to provide a process of the kind described which affords reduction of energy consumption and investment costs, while simultaneously performing efficiently and meeting the requirements of the appropriate authorities, and ultimately providing that the extracted $SO_2$ is obtained in pure form, thus rendering it chemically usable.

The present invention achieves this objective by first cooling the hot flue gas in regenerators in heat exchange with atmospheric air to temperatures of $0°$–$60°$ C. and then scrubbing it at this temperature with a solvent which is chiefly comprised of tetraethyleneglycol dimethylether.

The invention is based on the premise that the combination of a selective absorption of $SO_2$ by a suitable scrubbing agent, which can be regenerated completely and which is physically active, a and heat exchange between warm flue gas and combustion air yields a surprising synergistic effect. The use of the solvent suggested in the inventive process permits operation at ambient temperature due to the fact that this solvent has a low vapor pressure in comparison to dimethyl formamide while having equally high solubility towards $SO_2$.

Thus, the flue gas advantageously is cooled to a temperature of merely $20°$ to $50°$ C.

Further development of the inventive concept provides that more than half of the solvent consists of tetraethyleneglycol dimethylether. Specifically, the solvent on dry basis may consist of the following: 60–80% tetraethyleneglycol dimethylether, 15–20% of triethyleneglycol dimethylether, 2.5–7.5% of pentaethyelenglycol dimethylether and 2.5–7.5% of ether mixtures (Halbaether). This composition has the advantage that the vapor loss of the solvent is low. Moreover, as the solvent does not contain any homologs having more than 6 ethylene groups the viscosity of the solvent is low enough that it can be circulated without difficulty. It is greatly preferred when the solvent has the following composition when dry: 70% tetraethyleneglycol dimethylether, 20% triethyelenglycol dimethylether, 5% pentaethyleneglycol dimethylether and 5% monoether.

In the event that the flue gas contains dust or other impurities, like HCl, for instance, another variation of the invention provides that the solvent comprise up to 10%, preferably 2% to 8% water. This water additionally serves to rewash the solvent in the scrubbing column, thereby reducing possible losses.

In accordance with another embodiment of the inventive process, the hot flue gas is subjected to a scrubbing process with water prior to $SO_2$ absorption. A cycle water wash, cooled by cooling water, is particularly suitable for this purpose. This upstream water scrub removes halogen-containing matter from the flue gas in addition to removing the remaining dust particles, and also condenses part of the water vapor contained in the flue gas, thereby adjusting the temperature and $H_2O$ contents of the flue gas upon entering the actual scrubbing process for $SO_2$ removal to more favorable values, e.g. $15°$ to $35°$ C. and 2% to 6% $H_2O$, respectively.

In further developing the inventive process, it is provided that the solvent undergoes regeneration at an absolute pressure of 0.4 to 0.7 bar and at a temperature of $85°$–$110°$ C. Proceeding in this manner, a large part of the heat required for heating the regeneration column can be reused, for instance, for subsequent heating of the already warm water by approximately $10°$ to $20°$ C.

Cooling of the flue gases is by alternately reversible regenerators which are filled with an acid resistant conventional heat storage material. Advantageously, a minimum of three regenerators is used, whereby the main portion of the air passes through one regenerator as cooling air, a smaller portion passes through a second regenerator as scavenger air, and flue gas flows through the third regenerator. Usage of a minimum of three regenerators guarantees continues operation. Advantageously, the scavenger air quantity amounts to 5% to 35%, and preferably to 10%-20% of the total air quantity.

The desulfurized flue gas is obtained at temperatures of 0°-60° C., specifically between 20°-50° C. Usually, these temperature are not adequate to ensure a sufficient draft in the chimney. For this reason, the impure scavenger air is admixed with the desulfurized flue gas obtained after the scrubbing process, causing the temperature of the flue gas to rise. In many instances, particularly, when the scrubbing process is performed at temperatures of 0° to 30° C., the desulfurized flue gas is not sufficiently heated due to the small quantity of scavenger air available. Therefore, according to another variation of the invention, a small portion of the desulfurized flue gas is added to the scavenger air before it enters the second regenerator. Thus, adding the heated scavenger air to to the purified flue gas that was heated in the regenerator totally increases the temperature of the desulfurized flue gas ensuring an adequate draft of the flue gas in the chimney.

According to still another variation of the invention, a major portion of the cooling air, after passing through one regenerator at increased temperature, is utilized combustion air. This increases the total degree of efficiency of the combustion vessel. The smaller portion of the cooling air may be used for regeneration of the drying agents.

In this manner, the process of the invention almost entirely utilizes the exhaust heat of the flue gas to be cleaned.

DESCRIPTION OF THE DRAWING

The process of the invention is depicted schematically in the following example:

A flue gas to be purified passed to blower 2 after dust separation at a temperature of 130° to 150° C. via line 1, is compressed to approximately 0.15 bar gauge pressure and is cooled to approximately 40° C. in regenerator system 3. In the example depicted, the regenerator system consists of three separate regenerators, A, B, C, which are filled with a ceramic packing, e.g. Raschig Rings or Berl Saddles. While, for example, flue gas in flow direction from top to bottom cools the packing in regenerator A, a partial stream of the cleaned flue gas, introduced via line 4 along with a partial stream of atmospheric air, which is introduced by blower 6 via line 5, is heated in regenerator B by the heat of the scrubbing process or by ambient temperature, respectively, in a direction from bottom to top. At the same time, the main portion of air introduced via line 5 also is heated from bottom to top and is then passed in a major portion via line 7 to a combustion vessel (not depicted). In this manner, the exhaust heat of the flue gas to be cleaned is practically utilized in its entirety on one hand for preheating of the combustion air, e.g. increase of the total degree of efficiency of the vessel, and on the other hand for required reheating of the cleaned flue gas before it enters the chimney.

The flow through the regenerators is exchanged cyclically, e.g. from right to left after a switching time of approximately 3 minutes, for instance.

Accordingly, during the next cycle, purified flue gas and scavenger air flow through regenerator A, cooling air flows through regenerator B and impure hot flue gas flows through regenerator C.

Prior to switching the cooling air to regenerator B, the stream with cleaned flue gas is interrupted for a few seconds and for a flushing with scavenger air only, after which the cooling air is transferred to the boiler. Consequently, combustion in the downstream boiler is not disturbed by the reversal, but instead, continuously pure air with practically a constant warm temperature flows into the combustion chamber. The scavenger air and the heated portion of the desulfurized flue gas, which can amount to 10% to 25% of the total quantity, are added via line 8 to the main portion of the purified flue gas in line 9 before the chimney and are heated therewith accordingly, e.g. to approximately 65° C.

The flue gas being cooled in regenerator A falls below the acid dew point, i.e. acid droplets condense on the accumulator mass. The resultant condensate is vaporized during the passage of air in the reverse direction and is returned along with the cooling air in gaseous form to the combustion chamber.

Revaporization is accelerated, as the reaction $H_2O + SO_3 \rightleftarrows H_2SO_4$ preferably proceeds from right to left, due to the substantially lower quantities of water vapor in the cooling air compared to that of the flue gas during air passage. A large portion of the $SO_3$ thus returned to the boiler along with the air is again reduced to $SO_2$ due to the high combustion temperature. The internal $SO_3$ recirculation can, therefore, only result in a small increase, e.g. only an increase of a few ppm of $SO_3$ content in the flue gas, before a constant level is obtained.

The flue gas cooled to 40° C. is introduced into scrub column 11 via line 10 so as to be desulfurized by physical absorption. The scrubbing agent used is an ethyleneglycol dimethylether of the composition claimed with small percentages of water, which is fed to the middle of the column via line 12. Before entering the scrubbing cycle, residual amounts of dust and direct, like $SO_3$ and HCl are scrubbed out in the lower segment of the scrubbing column by a closed water cycle. At the upper end of scrubbing column 11, the portion of gaseous solvent corresponding to the very low vapor pressure, is scrubbed out by a relative small amount of recycle water via line 14. The desulfurized flue gas leaves the heat of the scrubbing column via line 9.

The solvent, loaded with $SO_2$ and a minor amount of dissolved $CO_2$ is withdrawn via line 15, heated in heat exchanger 16 against regenerated scrubbing agent and is passed to regeneration column 17. The dissolved gases are expelled via line 19 at the head of the regeneration column 17 by heating system 18 provided with low pressure steam, via line 19 at the head.

This stream also is separated into concentrated solvent and water vapor by distillation in the upper portion of the regeneration column, in order to recover the solvent dissolved in the scrubbing water at the head of scrubbing column 11. This water vapor is recondensed in a condenser 21 cooled by cooling water at the head of regeneration column 17.

It is of advantage to select the pressure, and inherently the temperature level in regeneration column 17 in such a way that 50% to 75% of the heat required by heating system 18 can be reutilized. Absolute pressure between 0.4 and 0.7 bar and a sump temperature of 85° to 110° C. have proven suitable. In order to recover heat, warm water of 50° to 60° C. is heated to approximately 70° to 85° C. in a heat exchanger positioned at the head of the regeneration column, e.g. vapor condensate in energy power plants or reflux water in connection with remote heat (heat power station). This heat exchanger, for example, could be connected with condenser 21.

The two regenerated streams of liquid, e.g. regenerated solvent from the sump and scrubbing water from the head, return to scrubbing column 11 via lines 12 or 14 respectively, whereby the regenerated solvent is cooled to approximately 40° C. in heat exchanger 16.

Regeneration column 17 is operated under a slight vacuum (approximately 0.6 bar absolute) and correspondingly in a low temperature at the sump in order to prevent damage to the absorption medium caused by secondary reactions in the aqueous cycle of the solvent.

At the head of regenerating column 17, the gas, rich in $SO_2$, is passed to compressor 22 via line 19, brought to a pressure of approximately 2.5 bar and after drying is condensed in heat exchanger 24 with a coolant in acid resistant reversible adsorption 23 resistant reversable absorbers 23. The contained portion of $CO_2$ as well as the residual $N_2$ do not condense here, but together with the gaseous portion of gaseous $SO_2$ vapor pressure having a corresponding to the liquefaction are returned to scrubbing column 11 via line 26. Thus, pure, anhydrous liquid $SO_2$ can be collected and stored in tank 25 for further use as desired.

Adsorbers 23 are reversible i.e. while for instance the $SO_2$ containing gas stream is dried in 23a, 23b is dried by a portion of the cooling air heated in regenerator C, which has been introduced via line 27.

Acids formed in the closed system by secondary reactions may be removed from the scrubbing cycle at various points as depicted by lines 28a, 28b, and 28c, illustrated by dotted lines, and may be neutralized by addition of appropriate chemicals, e.g. CaO in container 29.

It is obvious that the process of the invention may be carried out when, for instance, only two regenerators are used or if driers for the $SO_2$ containing gas are not used.

Based on the a examples depicted, heat balance of the regenerator system is as follows:

The heat capacity (quantity × specific heat) of the flue gas generally is approximately 10% of the required combustion air, i.e. in a process for cooling the flue gas to 100° C., an additional 10% of the purified flue gas could also be heated to 100° C. by the same amount of heat required for the process at 100° C. Thus, the entire amount of purified flue gas would be heated by about 10° C. prior to reaching the chimney. A reheating of the purified gas by about 25%, i.e. to approximately 65° C., by increasing the corresponding portion in the regenerator is at the expense of a reduction in heating the combustion air by about 15%. By utilizing this exhaust heat for energy recovery, which normally is considered to be lost exhaust heat in sulfur-containing flue gases, it results in the utilization of approximately 75% of the waste heat for the power station process, and approximately 25% for the reheating of the flue gas after desulfurization.

EXAMPLE 1,600,000 $Nm^3/h$ flue gas is purified from a 500 MW coal fired power station (3.5% S in the coal). The flue gas has the following composition:

76.6 Vol.% $N_2$
2.1 Vol.% $O_2$
12.2 Vol.% $CO_2$
0.24 Vol.% $SO_2+SO_3$ (=3840 $Nm^3/h$ 11 t/h)
8.86 Vol.% $H_2O$

The flue gas is scrubbed with 1600 t/h solvent having the composition of the inventive process. The remaining $SO_2$ contained in the purified gas amounts to 100 vppm (=160 $Nm^3/h$=480 kg/h). Thus, when using the solvent of the invention, desulfurization efficiency of 95.6% is obtained. The steam required for the regeneration of the loaded solvent amounts to approximately 30 t/h vapor at 2 bar. Compressing the vapors obtained from regenerated solvent in vacuum compressor 22 requires a power input of about 400 kW.

I claim:

1. A process for desulfurizing hot flue gases generated by the combustion of carbonaceous fuels, comprising the steps of:
   (a) cooling flue gas containing $SO_2$ and $SO_3$ to a temperature range between below the acid dew point and above 0° C.; and
   (b) scrubbing the flue gas with a solvent in a scrubbing column to obtain a desulfurized gas, wherein said solvent comprises more than 50% tetraethyleneglycol dimethylether; and
   (c) regenerating resultant solvent loaded with $SO_2$ for reuse in the scrubbing process.

2. The process according to claim 1, wherein the step of cooling is carried out between temperatures 20-50 degrees Centigrade.

3. The process of claim 2, wherein said solvent on a dry basis comparison 60-80% tetraethyleneglycol dimethylether, 15-25% triethyleneglycol dimethylether, 2.5-7.5% pentaethyleneglycol dimethylether.

4. The process of claim 3, wherein said solvent on a dry basis comprises 70% tetraethyleneglycol dimethylether, 20% triethyleneglycol dimethylether, and 5% pentaethyleneglycol dimethylether.

5. The process of claim 4, wherein said solvent contains up to 10% water water.

6. The process of claim 5, further comprising the step of scrubbing flue gases with water prior to scrubbing the flue gases with solvent.

7. The process of claim 6, wherein the step of regenerating solvent for reuse is carried out at an absolute pressure of 0.4-0.7 bar and a temperature of 85-110 degrees C.

8. The process of claim 1, wherein the step of cooling flue gas is carried out using a minimum of three regenerators.

9. The process of claim 8, further comprising the steps of:
   flowing a main portion of air through one regenerator as cooling air,
   flowing a smaller portion of air through a second regenerator as scavenger air, and
   flowing flue gas through a third regenerator.

10. The process of claim 9, wherein the amount of scavenger air is 5-25%, and of total air quantity.

11. The process of claim 10, further comprising the step of adding impure scavenger air to desulfurized flue gas wherein, said desulfurized flue gas is obtained downstream from the scrubbing steps.

12. The process of claim 11, further comprising the step of adding a small portion of desulfurized flue gas to the scavenger air before said scavenger air enters the second regenerator.

13. The process of claim 12, further comprising the step of flowing the cooling air from the first regenerator to a combustion chamber, whereby energy savings occur due to the cooling air having been preheated by the first regenerator prior to being used in a combustion process.

14. The process of claim 4 wherein said solvent contains 2-8% water.

15. The process of claim 9 wherein the amount of scavenger air is 10-20% of total air quantity.

16. The process of claim 1 wherein the scrubbing is conducted at 0°-30° C.

17. A process according to claim 1, wherein said desulfurized gas contains gaseous phase tetraethyleneglycol dimethylether, and further comprising scrubbing said desulfurized gas with water to remove said gaseous phase of tetraethyleneglycol dimethylether.

18. A process according to claim 17, wherein said scrubbing with water and the scrubbing with the solvent is conducted in the same scrubbing column.

19. A process according to claim 1, wherein said resultant solvent loaded with $SO_2$ further contains water, and conducting said regenerating of said resultant loaded solvent in a regenerating column containing a distillation zone, said regenerating comprising heating said resultant solvent to drive off the $SO_2$, and in said distillation zone, recovering solvent dissolved in said water.

20. A process according to claim 18, wherein said resultant solvent loaded with $SO_2$ further contains water, and conducting said regenerating of said resultant loaded solvent in a regenerating column containing a distillation zone, said regenerating comprising heating said resultant solvent to drive off the $SO_2$, and in said distillation zone, recovering solvent dissolved in said water.

21. A process according to claim 17, said regenerating column containing a condenser at the head of the column for condensing $H_2O$ and recycling resultant $H_2O$ to the head of the scrubbing column.

* * * * *